US006854586B1

(12) United States Patent
VanderMeer et al.

(10) Patent No.: US 6,854,586 B1
(45) Date of Patent: Feb. 15, 2005

(54) UNSTABLE ARTICLE CONVEYING DEVICE WITH DIVERTER HAVING CURVED PATH

(75) Inventors: Richard H. VanderMeer, Loveland, CO (US); Donald J. Simkowski, Loveland, CO (US)

(73) Assignee: Goldco Industries, Inc., Loveland, CO (US)

( * ) Notice: Subject to any disclaimer, the term of this patent is extended or adjusted under 35 U.S.C. 154(b) by 0 days.

(21) Appl. No.: 10/704,170

(22) Filed: Nov. 6, 2003

(51) Int. Cl.[7] .............................................. B65G 47/26
(52) U.S. Cl. ...................... 198/436; 198/442; 198/448; 198/678.1
(58) Field of Search ................................ 198/436, 437, 198/443, 442, 456, 457.01, 457.05, 448, 626.1, 678.1, 465.4

(56) References Cited

U.S. PATENT DOCUMENTS

| | | | |
|---|---|---|---|
| 3,580,640 A | * | 5/1971 | Eriksson ..................... 198/442 |
| 3,822,006 A | | 7/1974 | Shuttleworth |
| 4,723,649 A | * | 2/1988 | Hartness et al. ............ 198/442 |
| 4,822,214 A | | 4/1989 | Aidlin et al. |
| 4,889,223 A | * | 12/1989 | Bergstrom .................. 198/364 |
| 4,938,636 A | | 7/1990 | Aidlin et al. |
| 4,974,721 A | * | 12/1990 | Born ........................... 198/434 |
| 5,174,430 A | | 12/1992 | Ebira |
| 5,246,097 A | | 9/1993 | McCoy et al. |
| 5,501,552 A | | 3/1996 | Simkowski |
| 5,567,091 A | | 10/1996 | Johnson et al. |
| 5,630,679 A | | 5/1997 | Simkowski et al. |
| 5,842,818 A | | 12/1998 | Simkowski |
| 5,937,998 A | | 8/1999 | Priero |
| 6,279,729 B1 | | 8/2001 | Simkowski |
| 6,374,992 B1 | | 4/2002 | Simkowski |

FOREIGN PATENT DOCUMENTS

EP 0668223 8/1995

* cited by examiner

Primary Examiner—James R. Bidwell
(74) Attorney, Agent, or Firm—Robert E. Harris (57) ABSTRACT

A conveying device with a diverter having a curved path for conveying lightweight unstable articles, such as plastic bottles having a neck portion with a neck ring thereon. The unstable articles are conveyed along a first path to different ones of plural second paths through a third path at the diverter with the third path having first and second ends alignable with the first path and different ones of the plural second paths and a middle portion maintained in a curved configuration that is varied during aligning movement of the second end. A controller controls the aligning movement of the second end, preferably along a straight path, and the unstable articles are supported by engaging members in actuating guides to urge the unstable articles along the article paths.

38 Claims, 6 Drawing Sheets

Fig_6

Fig_7

Fig_8

Fig_9

Fig. 10

UNSTABLE ARTICLE CONVEYING DEVICE WITH DIVERTER HAVING CURVED PATH

FIELD OF THE INVENTION

This invention relates to an unstable article conveying device, and, more particularly, relates to a device having a diverter providing a curved path for conveying unstable articles, particularly unstable articles having a neck portion with a neck ring thereon, between a single path, or line, and multiple paths, or lines.

BACKGROUND OF THE INVENTION

It is oftentimes necessary to convey articles between different locations, such as, for example, moving articles from one location to another in connection with various steps in manufacturing, storage and/or use of articles, or containers.

Particular difficulty has been encountered, however, in conveying lightweight unstable articles, such as plastic containers or bottles, from one location to another location due, at least in part, to the tendency of such articles to easily tip during movement.

Where such articles have a neck ring, it is known that such articles can be engaged and supported by elongated guides or flanges engaging the bottom side of the neck ring with movement of the articles along the guides being urged by air directed at the articles (see, for example, U.S. Pat. No. 4,284,370 (Danler et al.), U.S. Pat. No. 4,724,035 (Mann et al.), U.S. Pat. No. 4,822,214 (Aidlin et al.), U.S. Pat. No. 4,938,636 (Aidlin et al.), U.S. Pat. No. 5,028,174 (Karass), U.S. Pat. No. 5,100,265 (Mirkin), U.S. Pat. No. 5,147,153 (Aidlin et al.), U.S. Pat. No. 5,161,919 (Smith et al.), U.S. Pat. No. 5,246,097 (McCoy et al.), U.S. Pat. No. 5,299,889 (Langenbeck) and U.S. Pat. No. 5,501,552 (Simkowski)) or with movement of the articles being urged by movement of the flanges (see, for example, U.S. Pat. No. 5,937,998 (Priero)).

It is also known that sections of fixed guides engaging the neck rings of the articles can be curved to cause a deviation, or turn, in the article flow path (see, for example, U.S. Pat. No. 5,501,552 (Simkowski)), and that fixed guides engaging the neck rings of articles can be flexed to provide height adjustment of the article flow path (see, for example, U.S. Pat. No. 5,630,679 (Simkowski et al.)).

It is likewise also known that unstable articles being air conveyed along a path established by fixed position guides can be diverted to auxiliary, or other, paths through the use of diverters (see, for example, U.S. Pat. No. 4,822,214 (Aidlin et al.), U.S. Pat. No. 4,938,636 (Aidlin et al.), U.S. Pat. No. 5,246,097 (McCoy et al.), and U.S. Pat. No. 5,501,552 (Simkowski)), and that displaceable arms can be pivoted to divert articles between single and multiple lines (see, for example, U.S. Pat. No. 5,567,091 (Johnson et al.) and EPO Publication 0 668 223 (Steinle) where air is utilized to urge the articles through the displaceable arm, U.S. Pat. No. 3,822,006 (Shuttleworth) and U.S. Pat. No. 5,174,430 (Ebira) where belts are utilized to convey the articles through the displaceable arm, and U.S. Pat. No. 5,842,818 (Simkowski) where gripping fingers are utilized to convey the articles through the displaceable arm).

An unstable article conveying device having a mechanical drive that includes a driven chain with flanges thereon is taught in U.S. Pat. No. 6,279,729 (Simkowski) and this mechanical drive was included in U.S. Pat. No. 6,374,992 (Simkowski) directed to an unstable article conveying device with a diverter. The invention set forth herein includes improvements to U.S. Pat. No. 6,374,992, at least in part and with respect to at least some applications of the invention, and U.S. Pat. Nos. 6,279,729 and 6,374,992 are hereby included herein by reference.

U.S. Pat. No. 6,374,992 teaches a device having guides with movable article engaging flanges as article actuators to urge the unstable articles along a first path, a plurality of second paths, and a third path extending between the first path and the plurality of second paths, and a diverter having a flexible bar connected with a hinged support arm to flex the bar upon movement of the third path from a straight third article path to different ones of the plural second paths positioned in an arc adjacent to the diverter path.

SUMMARY OF THE INVENTION

This invention provides an unstable article conveying device, particularly for unstable articles having a neck portion with a neck ring thereon, with the device including an article diverter having a curved article path.

The unstable articles may be conveyed along a first path (preferably in single line, or file) established by a first guide unit to a plurality of second paths (each preferably also conveying the articles in single line, or file) established by a plurality of second guide units through a third path established by a third guide unit. The third guide unit has a diverter with a first portion establishing a first end portion path of the third path that is aligned with the first path established by the first guide unit, a second portion establishing a second end portion path of the third path with the second portion being movable to align the second end portion path with different ones of the plural second paths established by the plurality of second guide units, and a third portion establishing a middle portion of the third path between the first and second end portions with the middle portion being maintained in a curved configuration that is varied, by use of at least one flexible bar (with two flexible bars being now preferred), during aligning movement of the second portion.

Aligning movement of the second portion of the diverter is controlled by a controller, or positioner, to align the second end portion of the third path with different ones (preferably successive adjacent ones) of the second paths established by the plurality of second guide units with movement of the second portion being along a substantially straight path being particularly useful.

An article actuator, with article engagable members, is provided within an actuator path at the actuator guide of the third guide unit (as now preferred, an actuator guide for the third guide unit may also be positioned at opposite sides of the third article path to engage the articles and urge the articles along the third article path upon movement of the article actuators along the third article path), with each article actuator preferably being a movable chain within a chain (actuator) path and having flanges extending therefrom to engage the articles in the third article path adjacent to the chain path.

In addition, conveyance of the unstable articles from the second end portion of the third path to the then aligned second end path of the second portion is preferably effected, or augmented, by air conveyance of the unstable articles, and a plurality of article diverters may be utilized to convey articles from a plurality of first paths to a plurality of second paths.

It is therefore an object of this invention to provide improved article conveying.

It is another object of this invention to provide improved article conveying for unstable articles having a neck portion with a neck ring thereon.

It is another object of this invention to provide improved article diverting for conveying of unstable articles between a single line, or path, and multiple lines, or paths.

It is another object of this invention to provide improved unstable article conveyance utilizing an article diverter having a curved article path.

It is another object of this invention to provide an improved unstable article conveying device that includes one or more movable diverters having an article path the middle portion of which is maintained in a curved configuration with the curved configuration being varied during movement of the diverter to align the diverter article path with different ones of a plurality of conveyor paths.

It is another object of this invention to provide an improved article conveying device that includes at least one flexible bar to maintain a curved article path configuration at a diverter with the curved article path configuration being varied upon movement of the flexible bar (or bars) due to diverter movement to achieve alignment between the article path of the diverter and different ones of multiple conveyor paths.

It is another object of this invention to provide an improved unstable article conveyor that includes a movable diverter having first and second opposite end portions establishing input and output paths and a third portion establishing a middle portion path extending between the input and output paths with the middle portion path being maintained in a curved configuration that is varied when the second path is moved by a controller to cause alignment of the second path with different ones of adjacently positioned conveyor paths.

It is another object of this invention to provide an improved unstable article conveyor that includes a first guide unit establishing a first path for the unstable articles and having article actuation associated with the first portion for urging the unstable articles along the first path, a plurality of second guide units each establishing a second path for the unstable articles and having article actuation associated with each of the plural second paths for urging the unstable articles along the plural second paths, and a third guide unit establishing a third path with the third guide unit having a diverter with article actuation associated with the third path for urging the articles along the third path and with a first portion of the diverter establishing a first end portion path of the third path aligned with the first path established by the first guide unit, a second portion establishing a second end portion path of the third path with the second portion being movable to align the second end portion with different ones of the plural second paths established by the plurality of second guide units, and a third portion establishing a middle portion of the third path with the middle portion being maintained in a curved configuration and with the curved configuration being varied during aligning movement of the second portion to align the second end portion with different ones of the second paths.

With these and other objects in view, which will become apparent to one skilled in the art as the description proceeds, this invention resides in the novel construction, combination, arrangement of parts, and method substantially as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Articles 12 to be conveyed, or transferred, by device 13 of this invention are normally lightweight unstable articles, such as plastic containers or bottles, and such containers or bottles may have a neck portion 14 with a neck ring 15 thereon, as has been indicated in the drawings.

It is meant to be realized, however, that other lightweight articles, and particularly lightweight unstable articles, could, at least for some applications, also be conveyed, or transferred, by the device of, and in accordance with, this invention.

Figure 1:
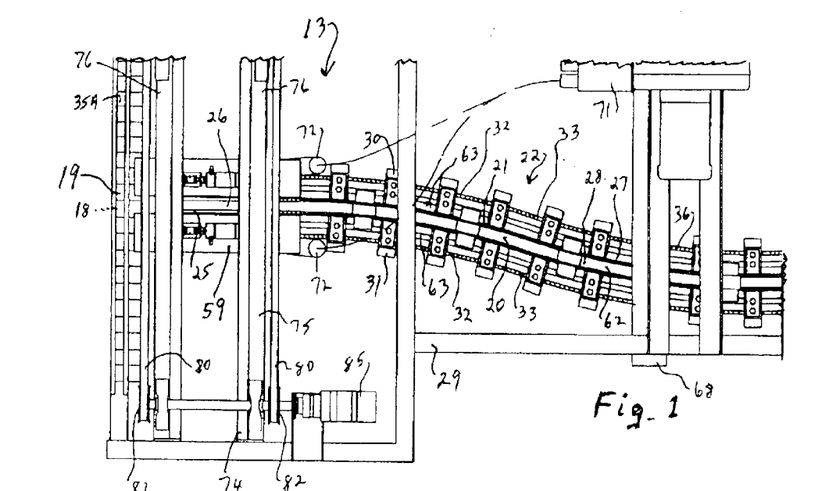
FIGS. 1 and 2, taken together, present a top view of the diverter of this invention.
Figure 2:
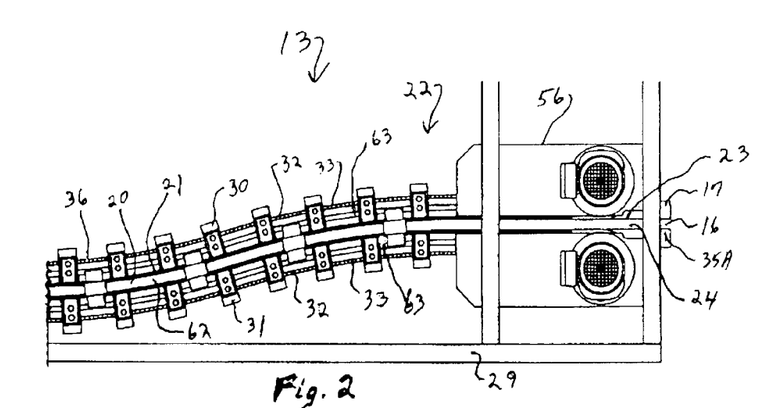
Figure 3:
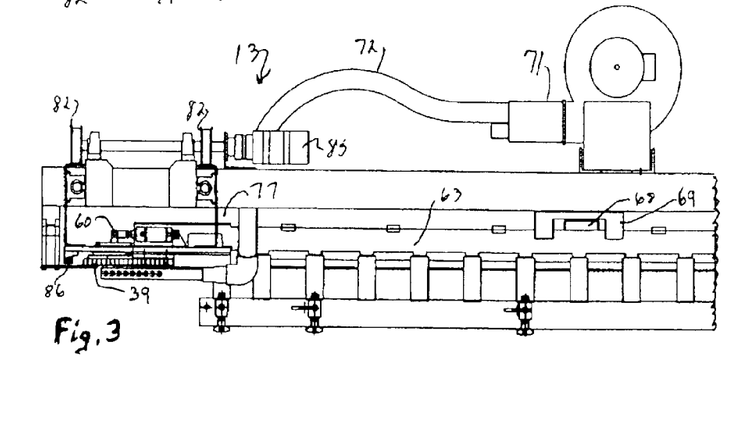
FIGS. 3 and 4, taken together, present a side view of the diverter shown in FIGS. 1 and 2.
Figure 4:
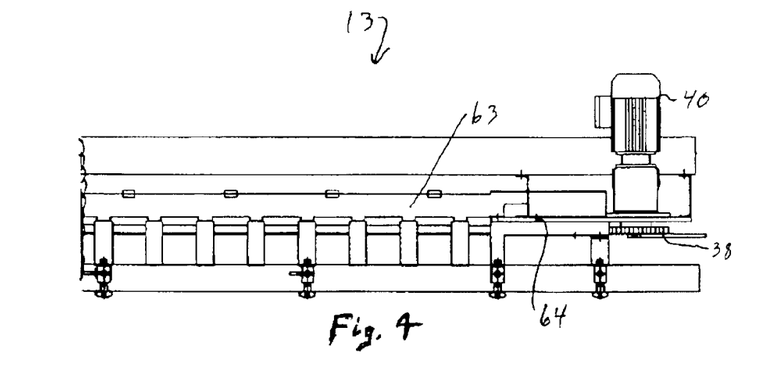

As shown in FIGS. 1 and 2, unstable articles 12 are conveyed into device 13, normally in single file, and are received at device 13 on first article path 16 established by first guide unit 17. The unstable articles received on first article path 16 are conveyed to different ones of plural, or multiple, second article paths 18, established by a plurality of second guide units 19, through third article path 20, also normally in single file, established at movable guide, or diverter, 21 of third guide unit 22.

Article, or line, diverter 21, as shown in FIGS. 1 through 4, has first portion 23 establishing first end portion path 24 of third article path 20 (aligned with first article path 16 as illustrated in FIG. 2), second portion 25 establishing second end portion path 26 of third article path 20 (with second portion 25 being movable to align second end portion path 26 with different ones of plural second article paths 18 as illustrated in FIG. 1), and third portion 27 establishing a middle path 28 of third article path 20.

Figure 10A:
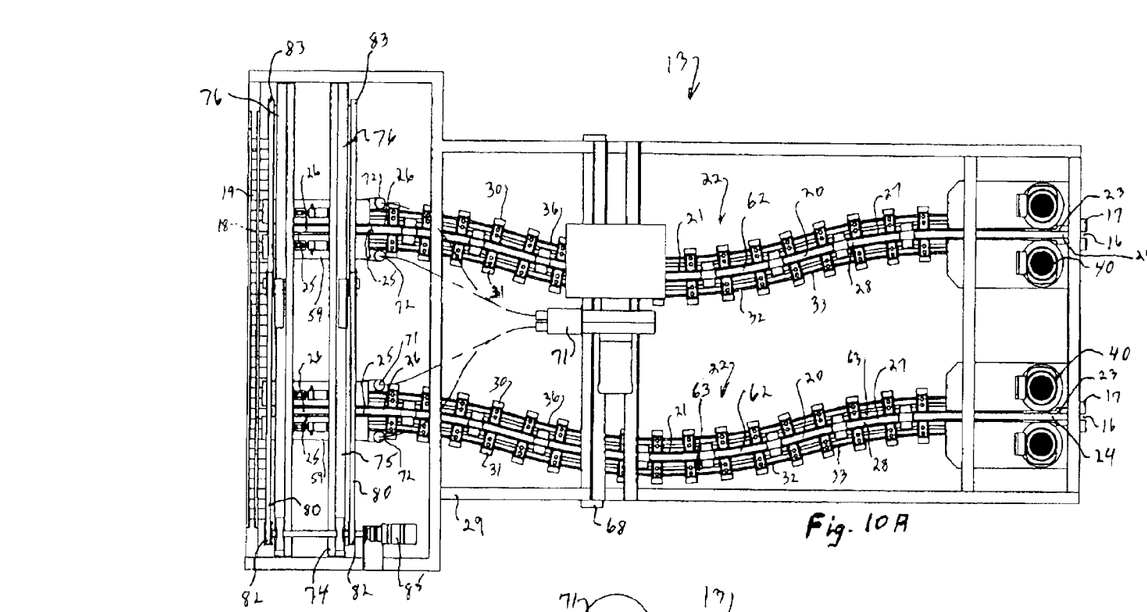
FIG. 10A is a top view illustrating use of two article diverters at the third guide unit.
Figure 10B:
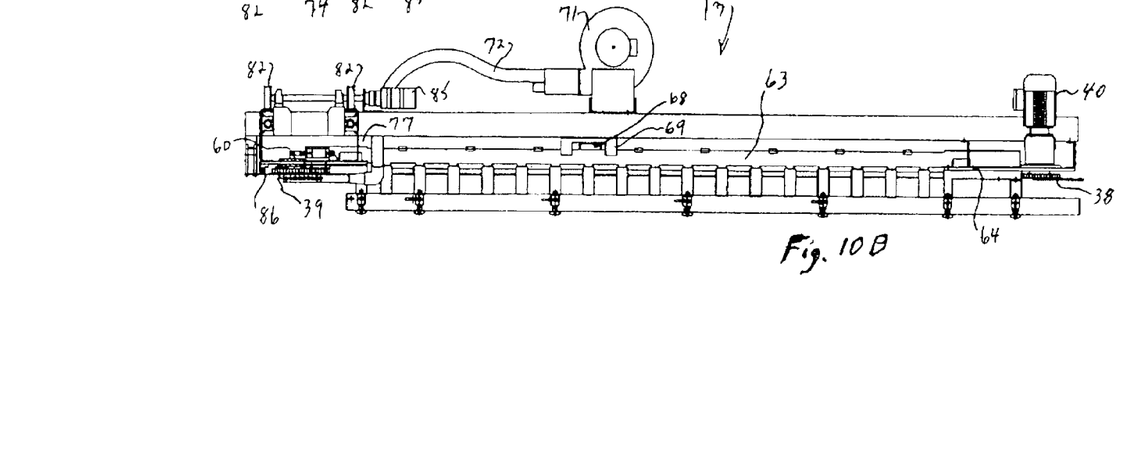
FIG. 10B is a side view of the two article diverters shown in FIG. 10A.
Figure 10C:
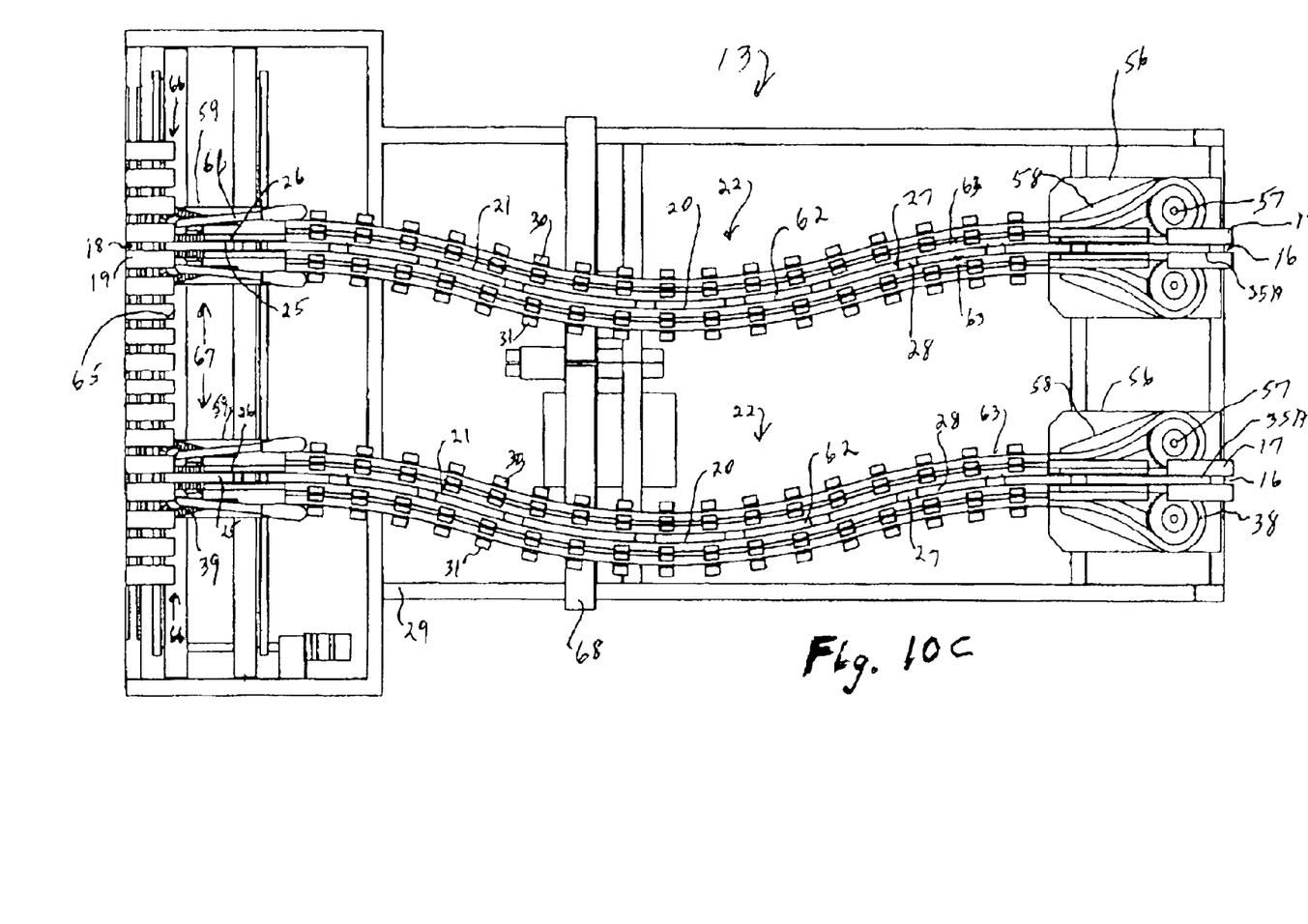
FIG. 10C is a bottom view of the two article diverters shown in FIG. 10A.

A plurality of second guide units 19 has been indicated in FIGS. 1, 10A, and 10C, with the FIGURES indicating, by way of example, the plurality of second guide units to be in excess of ten. It is meant to be realized, however, that any plural number, as needed or desired, could normally be utilized (when a plurality of diverters are utilized, however, the number of second guide units must be a multiple of the plural number of diverters utilized).

Third guide unit 22 is mounted on frame 29, and includes at least one actuator guide, and preferably includes a pair of actuator guides 30 and 31, with the pair of actuator guides being spaced to establish third article path 20 therebetween with article path 20 extending lengthwise between the guides (i.e, the guides are spaced from one another a sufficient distance to enable the articles to be conveyed along the article path established between the guides).

This arrangement is illustrated in FIGS. 1 through 4 for diverter 21 of third guide unit 22, with flexing of the diverter also being illustrated to establish a deviation in the third article path.

Figure 5:
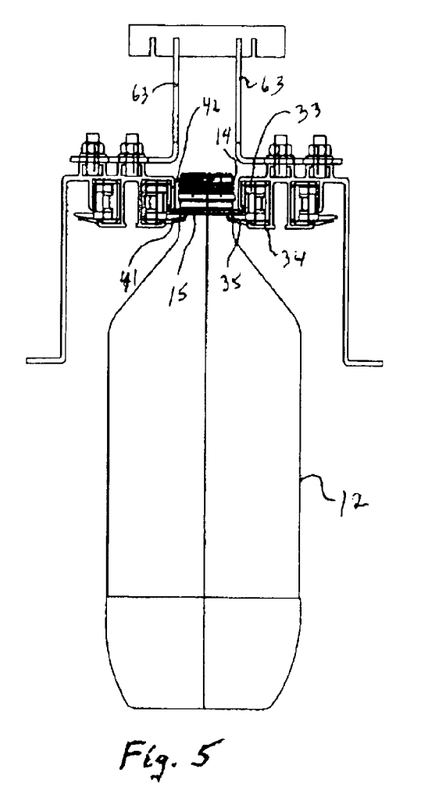
FIG. 5 is an end section view of the diverter shown in FIGS. 1 and 2.
Figures 6, 7:
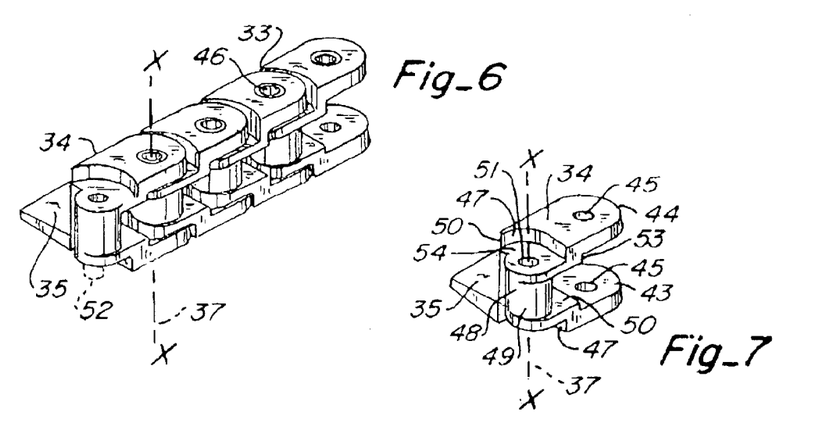
FIG. 6 is a perspective view illustrating a section of the chain used to provide article drive to urge the unstable articles along the article paths.
FIG. 7 is a perspective view of one link of the chain illustrated in FIG. 6.

Each of the pair of actuator guides 30 and 31 includes an article actuator, or drive arrangement, 32, now preferably a mechanical drive arrangement, with each mechanical drive arrangement, or unit, including, as best illustrated in FIGS. 5 through 7, a driven chain 33 having a plurality of links 34 with flanges 35 that extend from the chain to the article path associated with the actuator guide having the chain in actuator, or chain, path 36 to engage and urge article movement of articles then on the article path by movement of the chain along the lengthwise extending actuator path 36.

Figure 8:
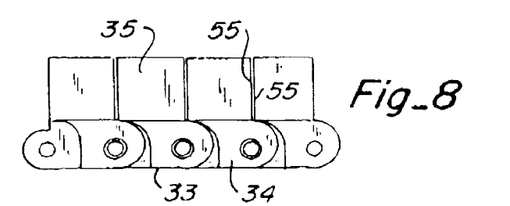
FIG. 8 is a simplified top view illustrating positioning of the flanges of the chain links during straight line movement of a chain, as illustrated in FIGS. 6 and 7, adjacent to one side of an article path.

It is also meant to be realized that, while not now preferred, a single drive arrangement might, for some applications (and as generally illustrated in FIG. 8), be utilized at one side of the article path with a flange, ledge, or the like, utilized, for example, at the other side of the article to provide article support and/or that drive, or article actuation, might, for some applications, be utilized in addition, or in lieu of, the particular article drive arrangement described herein.

As best shown in FIG. 5 and particularly described herein for conveyance of unstable articles 12 having neck portions 14 with neck rings 15 thereon, and using chain 33 with links 34 having flanges 35 extending therefrom to engage and urge the unstable articles along the associated article path, flanges 35 are preferably spaced from one another a sufficient distance to receive neck portions 14 (normally vertically extending as illustrated in the drawings) of unstable articles 12 therebetween and engage the bottom side of protruding neck rings 15 of the unstable articles to support the unstable articles and, due to frictional engagement between the articles and flanges, urge movement of the unstable articles along the article path established between the actuator guides and spaced flanges upon movement of chain 33 along chain path 36 (extending along and adjacent to the associated article path) in each of the actuator guides.

Additional support for articles conveyed along the article paths, such as, for example, side support provided by flanges depending from the actuator guides at opposite sides of the article paths for engagement with the sides of the articles in the article paths, can also be utilized, as needed, as is generally indicated in FIG. 5 with the side supports extending from the articles guides.

While the first and second guide units might utilize the above-described chain drive for conveying the unstable articles through the guide units as set forth herein with respect to third guide unit 22, it is now preferred that air conveyance be utilized to urge the unstable articles along fixed position article engaging members, or ledges, 35A (as is indicated in the drawings, the neck rings of the unstable articles engage article engaging members 35A so that the unstable articles are urged along the article engaging members by air directed at the unstable articles). It is meant to be realized, however, that other article drive arrangements could be utilized for at least some applications.

Major axis 37 of each link 34 of chain 33 extends in a direction normal (i.e., perpendicular) to the direction of chain path 36 established in each of the actuator guides 30 and 31. As best illustrated by FIGS. 6 and 7, when chain path 36 is horizontal, then major axis 37 of each link 34 extends vertically. This positioning of chain 33 is shown in FIG. 5 to be effected in actuator guides 30 and 31 with the guides substantially surrounding, or enclosing, chain 33.

Figure 9:
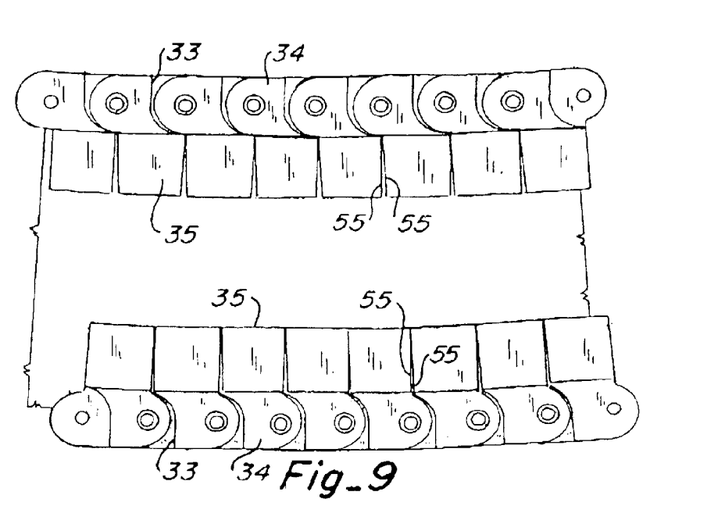
FIG. 9 is a simplified top view similar to that of FIG. 8 but illustrating movement of a pair of chains at opposite sides of an article path during a deviation, or turn, in the article flow path.

As best indicated in FIGS. 1, 2, 10B and 10C), in conjunction with FIG. 5, each actuator guide includes chain 33, preferably an endless chain that extends around sprockets 38 and 39 with sprocket 38 being rotatively driven by electric motor/gear box 40 to cause movement of each chain 33 along chain path 36. With use of a pair of actuator guides 30 and 31 positioned at opposite sides of an associated article path, separate endless chains 33 with flanges 35 extending therefrom are thus positioned at opposite sides of the associated article path (as generally indicated in FIG. 9) so that flanges 35 engage articles at each side of the article path for urging movement of unstable articles then on the article path along the associated article path upon movement of chains 33 along chain paths 36.

Each actuator guide has an elongated opening 41 that extends along the entire guide wall 42 facing the article path to enable flanges 35 to extend, from each link 34 of chain 33 in chain path 36 then within the guide, into the adjacent associated article path.

As best shown in FIG. 7, each link 34 of chain 33 has a pair of end plates, or ears, 43 and 44 that extend in a plane parallel to the direction of chain movement (i.e., horizontal when the direction of chain movement is horizontal) with end plates 43 and 44 being spaced from one another along major axis 37 of each link (i.e., vertically spaced when the direction of article movement is horizontal), with apertures 45 therein to receive linking pins 46 (as indicated in FIG. 6) between end plates 43 and 44, and with end plates 43 and 44 having contoured edge, or side, portions 47.

Each chain link 34 also has a body portion 48 that includes a cylindrical portion 49 that extends in a direction normal to the direction of chain path 36 (i.e., extends vertically when chain path 36 extends horizontally). End plates, or ears, 50 are at opposite ends of cylindrical portion 49 and extend in a plane normal to cylindrical portion 49 (i.e., are horizontally positioned when cylindrical portion 49 is vertically positioned), with cylindrical portion 49 and end plates 50 having apertures 51 therethrough for receiving linking pin 52 (linking pin 52, as illustrated in FIG. 6, is indicative of the linking pin needed to complete the endless chain and hence, when so used, becomes an additional linking pin 46).

End plates 50 also extend under end plates 43 and 44 for connection to end plates 43 and 44 thereat, with end plates 50 having edge, or side, portions 53 (i.e., vertically extending when end plates 50 are horizontally positioned) that are offset from end plates 43 and 44, and each link also having wall 54 extending between end plates 43 and 44 and cylindrical portion 49 at the side of the link from which flanges 35 extend for strengthening the link.

As best shown in FIG. 5, each flange 35 extends from the lower end portion (and therefore from end plate 43 and from the bottom of wall 54) of each link 34 in a direction normal to both chain path 36 and major axis 37 of each link 34 (i.e., each flange 35 extends horizontally from each chain link 34 and from wall 54 when chain path 36 extends horizontally) to engage articles then on the associated article path.

As indicated in FIGS. 6 and 7, when links 34 are connected, or joined, by the linking pins to form endless chain 33, adjacent links have the cylindrical portion of one link received between end plates 43 and 44 of an adjacent link with contoured, or shaped, side edges 47 of each of end plates 43 and 44 of adjacent links, as well as side edges 53, adjacent to cylindrical portion 49 of adjacent links, permitting rotation of each link with respect to each adjacent link in the chain.

With adjacent links joined to form an endless chain, flanges 35 of adjacent links extending into the associated article path are contiguous to one another, as indicated in FIGS. 8 and 9, to virtually form a moving continuous support for engaging articles then in the associated article path and urge the articles along the path upon movement of the endless chain to cause the flanges to be moved along the article path.

As indicated in FIG. 8 (illustrating a chain at one side of the article path), during a straight run of the chain, which may occur, for example, along first and second article paths 16 and 18, flanges 33 extend substantially parallel with respect to one another into the article conveying path with substantially equal small spacing between adjacent edges 55 of each of the flanges.

As indicated in FIG. 9, angular deviations, or bends, in the associated article conveying path are enabled since adjacent links of the chains can be rotated with respect to one another to a degree sufficient to allow angular deviation of the chain path.

As indicated, with chains utilized at opposite sides of the angular deviating section of the associated article path, flanges 35 at one side of the associated article conveying path are angularly deviated, or rotated, in one direction so that adjacent flanges have an increased spacing at the outer edges of adjacent flange edges 55, while flanges 35 at the opposite side of the associated article path are angularly deviated, or rotated, in the opposite direction so that adjacent flanges have a decreased spacing at the outer edges of adjacent flange edges 55.

In a working embodiment of this invention, it has been found that a spacing of about 0.020 inches when parallel with a maximum increase and/or decrease in spacing of about 0.010 inches for turns results in about a permissible 24 inch turning radius.

It has also been found in a working embodiment of this invention that use of dissimilar material for the chain and chain guide is preferred, with use of dissimilar polymer materials being now preferred, including, for example, Acetal for the chain and oil impregnated ultra high molecular weight (UHMW) polymer for the chain guide.

First portion 23 of diverter 21 (establishing first end portion path 24 of article path 20 aligned with first article path 16) has mounting plate 56 with a pair of drive shafts 57 mounted thereon. Sprocket 38 is rotatively mounted on each of drive shafts 57 and positioned to be at each side of the associated article path so that each sprocket 38 is driven by a motor/gear box 40.

Actuator guides 30 and 31, each having chain 33 in chain path 36, are mounted on mounting plate 56, spaced from one another, to form, or establish, first end portion path 24 of third article path 20 between the inner run of the chain in each actuator guide, inwardly of sprockets 38, with the outer side of each guide having a chain diverter 58 to divert the outer, or return, portion of the endless chain from sprockets 38 into the actuator guides.

Second portion 25 of diverter 21 (establishing second end portion path 26 of third article path 20 alignable with different ones of plural article paths 18) includes mounting plate 59 having a pair of sprocket mounts 60 mounted thereon (a sprocket 39 is rotatively mounted on each of sprocket mounts 60 and positioned to be at each side of the article path).

Actuator guides 30 and 31, having chains in chain paths 36, are mounted on mounting plate 59 spaced from one another, and inwardly from sprockets 39, to form, or establish, second end portion path 26 of third article path 20 therebetween with the outer side of each guide having chain diverter 61 to divert the outer, or return, portion of the endless chain from sprockets 39 into the guide.

As best shown in FIGS. 1, 2, 10A and 10C, middle path 28 of third article path 20 at third portion 27 of article diverter 21 is maintained in curved configuration (shown generally by the numeral 62) utilizing a pair of flexible bars 63 (although a single flexible bar could be utilized at least for some applications) with flexible bars 63 being fixed at opposite ends to first and second portions 23 and 25 by bolts 64 (as indicated, the flexible bars are maintained in a curved configuration between the opposite ends of first and second portions 23 and 25 by being fixed thereto to maintain middle portion 28 in a like curved configuration).

Flexible bars 63 extend in a curved configurations spaced and adjacent to one another (and preferably with the flexible bars extending substantially parallel to one another) at middle path 28 of third article path 20, with the flexible bars being preferably made of stainless steel and have a thickness of about one-tenth of an inch with a width of about two and one-half inches at middle path 28.

When second portion 25 is moved during aligning movement of the second portion, this causes flexible bars 63 to move resulting in a variation in the curved configuration of middle path 28. Middle path 28 extends a sufficient distance such that the middle path is never straight, as is indicated in the drawings, even at the most distant positioning of second end portion 26 for alignment thereat with the outermost ones of plural second article paths 18, and the distance of travel of the unstable articles through middle path 28 remains the same regardless of variations in the curved configuration of the middle path.

As indicated in the drawings, plural second article paths 18 of the plurality of second guide units 19 preferably extend parallel to one another and have end portions 65 that terminate substantially along a common plane 66, preferably normal (i.e., perpendicular) to the path of unstable articles conveyed through plural second article paths 18 and second end portion path 26 (common plane 66 is substantially vertical when the paths of the conveyed unstable articles are substantially horizontal, as is indicated in the drawings), and second portion 25 is moved so that second end portion path 26 is moved substantially along a straight path 67 also preferably normal to the path of unstable articles conveyed through plural second article paths 18 and second end portion path 26 (straight path 67 is substantially horizontal when the paths of the conveyed articles are substantially horizontal, as is indicated in the drawings) adjacent to the common plane of the termination of the plural article paths of the second guide unit to enable alignment of the termination of second end portion path 26 with each of said plural second article paths 18.

A cross bar 68 is also mounted on frame 29 to slidingly engage flexible bars 63 in hanger 69 so the flexible bars are free to slide in opposite directions along the cross bar to vary the curved configuration of the cross bar as necessary in order to vary the curved configuration of middle portion 28.

Actuator, or chain, guides 30 and 31 are connected to flexible bars 63 at diverter 21 to cause flexing of flexible bars 63 as necessary for path alignment between second end portion path 26 and different ones of plural second paths 18.

Transfer of articles between actuator guide units is preferably effected by air conveyance, with use of air conveyor-blower 71 to provide air directed toward the unstable articles through tubes 72 to thereby urge the unstable articles from the second end portion path 26 to the then aligned one of the plural second paths 18 to effect, or augment, movement of the articles across the relatively short space between the adjacent article paths.

As indicated in FIGS. 10A, 10B, and 10C, a plurality of diverters 21 (two as now preferred and as illustrated in FIGS. 10A, 10B, and 10C, although additional diverters could be utilized for some applications) are utilized to convey articles from a plurality of first paths 16 (two paths 16 as illustrated) to a plurality of second paths 18 through article diverters 21. Operation of the devices as shown in FIGS. 10A, 10B, and 10C is the same as operation of the device with a single diverter, except that the plural diverters are moved in unison to effect concurrent multiple conveyance of the unstable articles.

Positioning of diverter 21 for alignment of first end portion path 24 of third article path 20 with the different ones of plural article paths 18 may be effected by controller 74 having a positioning unit 75 that includes, as shown in FIGS. 1, 10A, 10B and 10C, controller support 76 extending across second portion 25 of line diverter 21 with controller support 76 having carriage 77 (having support plate 59 connected thereto) slidably mounted thereon so that the carriage moves in reciprocal directions back and forth across control support 76.

Carriage 77 causes flexible bars 63 to be flexed to vary the curved configuration of flexible bars 63 and hence cause actuator guides 30 and 31 to vary the curved configuration of middle portion 28 of third path 20 like that of then varied configuration of flexible bars 63.

Carriage 77 is connected by connecting arm 79 with timing belts 80 mounted for rotation about sprockets 82 and 83 near the opposite ends of controller support 76, and sprockets 82 are rotatively driven by electric motor 85 to drive belts 80 and precisely position second portion 25 of line diverter 21 at a then selected one of the plurality of second guide units 19 to thereby align second end portion path 26 of third article path 20 with the then selected one of plural second article paths 18.

Controller 74 could also be realized by other apparatus, such as, for example, through use of a screw drive arrangement, particularly where more precise positioning of the diverter is needed than is normally provided by a belt-carriage arrangement.

Second end portion 26 of third article path 20 is preferably successively and sequentially aligned with each adjacent one of plural second article paths 18 by repeated and/or additional flexing of flexible portion 27 of line diverter 21 as electric motor 85 causes second end portion path 26 to be moved in position from one second path 18 to the next adjacent path, and then in the opposite direction until the opposite outer plural second article path is reached, with the alternate directions of displacement of the second end portion path being continued so long as normal operation is continued.

An article counter 86 is positioned adjacent to second end portion path 26 of line diverter 21 to count the number of unstable articles passed from second end portion path 26 of article path 20 to plural second article paths 18 so that each time that a predetermined count is reached, article counter 86 can cause actuation, or energization, of electric motor 85 to shift delivery of unstable articles from a then selected one of the plural second article paths to an adjacent one of the plural second article paths.

While a specific controller has been described herein for controlling line diverting, it is meant to be realized that control of line diverting, other than as above described, could also be utilized.

It is also to be realized that the unstable articles are normally discharged from the second guide units for further conveyance, such as, for example, for conveyance to a palletizer for palletizing the unstable articles, and it is also meant to be realized that the direction of article flow could be reversed to transfer the unstable articles from the plural second paths to the first path through the third path, and that such transfer could, for example, be used in connection with depalletizing of unstable articles.

As can be appreciated from the foregoing, this invention provides an improved conveying system having a diverter providing a curved article path.

What is claimed is:

1. A device for conveying unstable articles, said device comprising:
    a first guide unit establishing a first path for the unstable articles and having article actuation associated with said first path for urging the unstable articles along said first path;
    a plurality of second guide units establishing plural second paths for the unstable articles and having article actuation associated with each of said plural second paths for urging the unstable articles along said plural second paths;
    a third guide unit establishing a third path for the unstable articles with said third guide unit having a movable article diverter with article actuation associated with said third path for urging the unstable articles along said third path, said article diverter having a first portion establishing a first end portion path of said third path aligned with said first path, a second portion establishing a second end portion path of said third path with said second portion being movable to align said second end portion path with different ones of said plural second paths, and a third portion establishing a middle portion of said third path extending between said first and second end portions with said middle portion being maintained in a curved configuration that is varied during said aligning movement of said second portion; and
    a controller for controlling movement of said second portion of said article diverter to align said second end portion path with said different ones of said plural second paths.

2. The device of claim 1 wherein said plural second paths of said plurality of second guide units have end portions that terminate substantially along a common plane, and wherein said controller causes said controlling movement of said second portion of said article diverter to be substantially along a straight path adjacent to said common plane.

3. The device of claim 2 wherein said common plane is substantially normal to the path of unstable articles conveyed through said second end portion path of said third guide unit and said plural second paths of said plurality of second guide units.

4. The device of claim 1 wherein said paths for the unstable articles are established by said guide units such that the unstable articles are conveyed along said paths in single line.

5. The device of claim 1 wherein said article actuation at said third guide unit includes at least one article actuator and an actuator guide for establishing an actuator path extending along and adjacent to said third article path.

6. The device of claim 5 wherein said third portion of said article diverter includes at least one flexible bar having said actuator guide connected therewith with said at least one flexible bar being maintained in said curved configuration.

7. The device of claim 6 wherein said article diverter includes two spaced flexible bars extending substantially parallel to one another.

8. The device of claim 6 wherein said article diverter includes a cross bar having said at least one flexible bar slidingly engaged with a portion of said at least one flexible bar to support said at least one flexible bar and allow said at least one flexible bar to move during said aligning movement of said second end portion of said third guide unit.

9. The device of claim 6 wherein said at least one flexible bar of said article diverter is caused to be repeatedly flexed by movement of said second portion of said article diverter to align said second end portion path of said third path with said different ones of said plural second paths to thereby vary said curved configuration of said middle portion of said third path.

10. The device of claim 9 wherein said at least one flexible bar of said article diverter extends between said first and second portions of said article diverter and has first and second ends fixed to said first and second portions of said article diverter, and wherein said controller includes a positioning unit connected with said second portion of said article diverter for causing movement of said second portion to thereby control and position said second portion of said article diverter so that said second end portion path of said third path is aligned with said different ones of said plural second paths.

11. The device of claim 5 wherein each said at least one article actuator includes a mechanical driving unit that moves along said actuator path established by said actuator guide for urging the unstable articles along said third article path.

12. The device of claim 11 wherein said mechanical driving unit includes a movable chain having flanges extending therefrom for engagement with the unstable articles on said associated article path for urging the unstable articles along said third article path.

13. The device of claim 12 wherein said third guide unit includes first and second actuator guides with article actuators positioned at opposite sides of said third article path, with each of said article actuators including a movable chain with said flanges of said chains extending toward said third article path to engage unstable articles therein and urge the unstable articles along said third article path upon movement of said chains along said actuator paths established by each of said first and second actuator guides.

14. The device of claim 5 wherein article actuation between said second end portion path of said third guide unit and each said plural second path of said plurality of second guide units includes an air conveyor for urging unstable articles from said second end portion path to said plural second path then aligned with said second end portion path.

15. The device of claim 1 wherein said first guide unit establishes a plurality of said first paths, wherein said third guide unit establishes a plurality of said third paths and has a plurality of said movable article diverters each of which has a said first portion establishing a said first end portion path aligned with a different one of said plurality of said first paths and a said second portion establishing a said second end portion path alignable with different ones of said plural second paths of said plurality of second guide units, and wherein said controller controls movement of said plurality of said movable article diverters.

16. The device of claim 1 wherein the unstable articles are plastic containers having a neck portion with a ring thereon, and wherein said guide units are engagable with said neck rings for supporting and urging said plastic containers along said article paths.

17. A single-to-multiple line conveying device for unstable articles each of which has a neck portion with a neck ring thereon, said device comprising:

a first guide unit establishing a first single line path for the unstable articles and having article actuation associated with said first single line article path for urging the unstable articles along said first single line path;

a plurality of second guide units establishing adjacent multiple second single line paths for the unstable articles and having article actuation associated with each of said plural single line paths for urging the unstable articles along said associated multiple second single line paths;

a third guide unit having a movable line diverter with a pair of spaced guides establishing a third single line path between said spaced guides with each of said spaced guides having a chain movable along a third chain path adjacent to said third single line path with each said chain having article engaging members for urging the unstable articles along said third single line path upon movement of said chains along said third chain paths, and said line diverter having a first portion establishing a first end portion path of said third single line path, a second portion establishing a second end portion path of said third single line path with said second portion being movable to align said second end portion path with different ones of said multiple second single line paths, a third portion establishing a middle portion of said third single line path extending between said first and second end portion paths of said third single line path, and a pair of flexible bars having opposite end portions fixed to said first and second portions of said line diverter and maintaining said middle portion of said third single line path in a curved configuration with said pair of flexible bars causing said curved configuration to be varied upon flexing of said pair of flexible bars due to said aligning movement of said second portion of said line diverter; and a controller connected with said second portion of said line diverter for controlling said aligning movement of said second portion of said line diverter.

18. The device of claim 17 wherein said second portion of said line diverter is movable along a substantially straight path during said aligning movement of said second portion of said line diverter, and wherein said controller causes movement of said second portion of said line diverter along said substantially straight path to align said second end portion path of said third single line path of said line diverter with predetermined different ones of each of said multiple second single line paths of said plurality of second guide units.

19. The device of claim 18 wherein said controller includes a motor and timing belt for positioning said second portion of said line diverter so that said second end portion path of said third single line path is caused to be sequentially aligned with each next adjacent one of said multiple second single line paths of said plurality of second guide units each time that said motor is actuated during normal operation, said controller also including an article counter for counting the number of the unstable articles moved from said third single line path to said multiple second single line paths with said article counter causing actuation of said motor whenever said article counter reaches a predetermined count.

20. A device for conveying unstable articles between a first path and a plurality of second paths utilizing an article diverter, said article diverter comprising:

a first portion establishing a fixed position first end portion path alignable with the first path;

a second portion establishing a second end portion path with said second portion being movable between predetermined positions so that said second end portion path is aligned with different ones of the plurality of second paths; and a third portion connected with said first and second portions and having a middle portion path established thereat to convey the unstable articles between said first and second end portion paths, said middle portion path being maintained in a curved configuration with said curved configuration being varied during said aligning movement of said second portion whereby the unstable articles urged along said paths established at the article diverter are transferred through said then aligned paths.

21. The device of claim 20 wherein the plurality of second paths have end portions that terminate substantially along a common plane, and wherein said second portion of said article diverter moves substantially along a straight path adjacent to said common plane during said aligning movement.

22. The device of claim 20 wherein the article diverter includes at least one flexible bar fixed to said first and second portions and connected with said third portion whereby said at least one flexible bar maintains said curved configuration of said middle portion path and varies said curved configuration during said aligning movement of said second portion of the article diverter.

23. The device of claim 22 wherein said at least one flexible bar includes a pair of flexible bars.

24. The device of claim 20 wherein the article diverter includes at least one article actuator and an actuator guide for establishing an actuator path extending along and adjacent to said paths established for the unstable articles through the article.

25. The device of claim 24 wherein said article actuator includes a mechanical driving unit that moves along said actuator path for urging the unstable articles along said paths established at the article diverter.

26. The device of claim 25 wherein said mechanical driving unit includes a movable chain having flanges extending therefrom for engagement with the unstable articles on said paths established at the article diverter for urging the unstable articles along said paths established at the article diverter.

27. The device of claim 20 wherein the article diverter is connected with a controller having a positioning unit connected with said second portion of the article diverter to control and position said second portion of the article diverter so that said second end portion path is aligned with different ones of the plural second paths.

28. The device of claim 20 wherein the article diverter includes first and second article actuators and actuator guides at opposite sides of said paths established at the article diverter.

29. The device of claim 20 wherein said device includes a plurality of article diverters with said second portion of each article diverter being alignable with different ones of the plurality of second paths.

30. The device of claim 29 wherein said plurality of article diverters includes two article diverters.

31. The device of claim 20 wherein the unstable articles are lightweight containers.

32. A method for conveying unstable articles, said method comprising:

establishing a first path for conveying the unstable articles;

establishing plural second paths for conveying the unstable articles;

establishing a third path for conveying the unstable articles with said third path having first and second opposite ends and a middle portion between the first and second opposite ends with the first end of said third path being aligned with said first path and the middle portion being maintained in a curved configuration;

moving said second opposite end to align said second opposite end with different ones of said plural second paths and varying said curved configuration of said middle portion of said third path during said aligning movement of said second opposite end; and urging the unstable articles through said aligned paths.

33. The method of claim 32 wherein said plural second paths terminate substantially along a common plane, and wherein said aligning movement of said second opposite end is along a substantially straight path adjacent to said common plane.

34. The method of claim 32 wherein said method includes providing at least one flexible bar adjacent to said middle portion of said third path and moving said at least one flexible bar to cause said varying of said curved configuration of said middle portion of said third path during said aligning movement of said second opposite end.

35. The method of claim 34 wherein said method includes providing a pair of flexible bars as said at least one flexible bar.

36. The method of claim 32 wherein said method includes providing a chain with flanges to urge the unstable articles along said third path.

37. The method of claim 32 wherein said method includes air conveying the unstable articles to urge the unstable articles from second opposite end of the third path onto the then aligned one of said plural second paths.

38. The device of claim 32 wherein said method includes providing a plurality of said first and said third paths with each of said plurality of said first paths being aligned with a different one of said plurality of said third paths and each of said plurality of said third paths being alignable with different ones of said plural second paths.

* * * * *